3,078,179
Patented Feb. 19, 1963

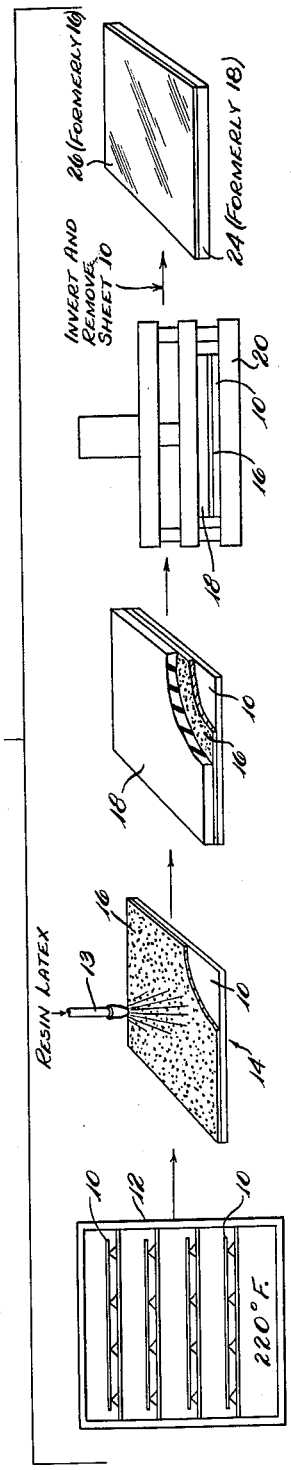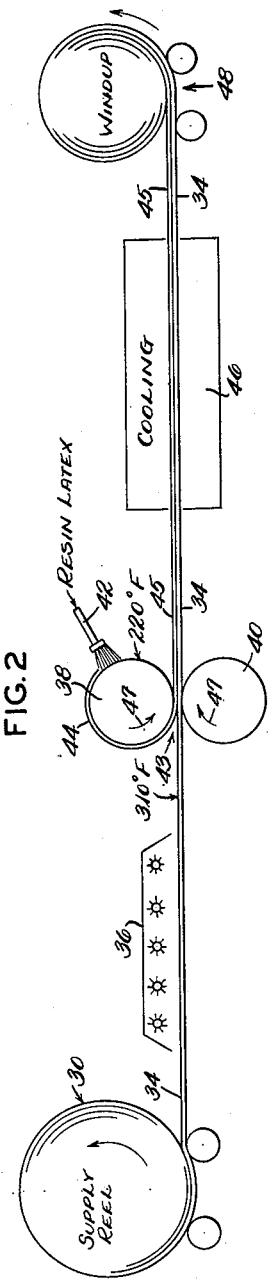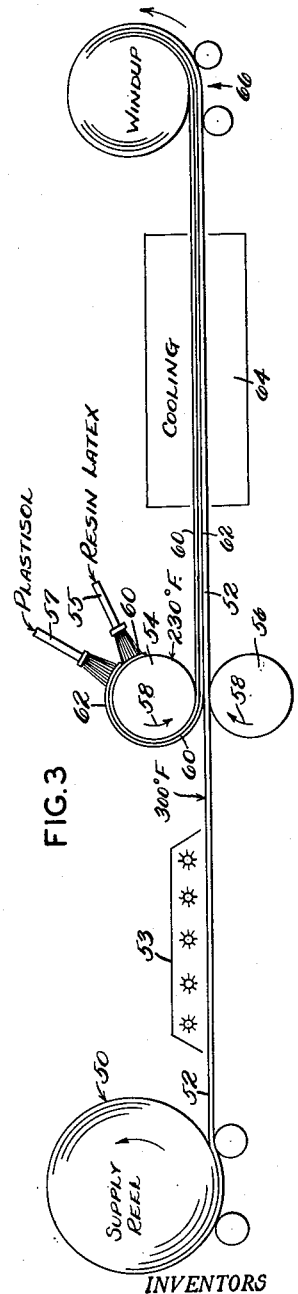

3,078,179
PROCESS OF APPLYING COATING OF UNPLASTICIZED POLYVINYL CHLORIDE RESIN TO A SUBSTRATE
Leroy B. Kuhn, Douglassville, and Russell A. Park, Norristown, Pa., assignors to The Firestone Tire & Rubber Company, Akron, Ohio, a corporation of Ohio
Filed Nov. 4, 1958, Ser. No. 771,921
6 Claims. (Cl. 117—47)

This invention relates to a process for applying a relatively hard, thin, unplasticized coating of a thermoplastic resin upon appropriate substrates.

It is often desirable to apply a thin top coating of hard, unplasticized thermoplastic resin on the surfaces of various articles, for instance on the surface of fibrous sheet materials or objects of relatively softer resinous compositions, in order to provide a high gloss and polish on the surface, and to increase the resistance to wear, scratching, staining, etc. This is commonly done by providing a preformed flat polished sheet of a relatively hard resinous composition, for instance an unplasticized vinyl chloride resin, and laminating the sheet to the article by means of heat and pressure. This process, while it is effective, involves the considerable expense of preparing the hard resinous composition sheet, and the trouble and spoilage involved in handling and laminating the sheet to the substrate.

With especial reference to vinyl flooring products, in normal usage these products tend to acquire a more or less permanent soil accumulated within the surface layers thereof, evidenced by a yellow to brown "traffic lane" in the heavily travelled areas in objectionable contrast to the little used corners of the area. This is due to various components of traffic dirt which are compatible with the plasticizers in the resin, such as bituminous products from paving, extenders used in heel and sole materials, and the like. One method of minimizing this trouble is to laminate a clear, hard, unplasticized resin sheet on top of the basic flooring material; this surfacing sheet, being relatively free from plasticizers, is much more stain-resistant than the underlying base flooring material. Even these laminated products leave some room for improvement in respect to stain resistance; the resin used in the hard top surface lamina was necessarily subject to milling, calendering and other operations which rearrange the polymer molecules from their more compact, denser, configurations occurring in the virgin resin, so that small quantities of stabilizers, lubricants, and even plasticizers diffused from the underlying substrate are interspersed amongst the polymeric chains and provide an entree for the migration of the plasticizers to the surface, where they interact with traffic soil to produce staining.

It is accordingly an object of this invention to provide a novel method for the application of a relatively hard, unplasticized thermoplastic resin top layer upon various appropriate substrates.

Another object is to provide such a process which will produce such a top layer which will have a smooth and, if desired, highly polished or embossed surface.

A further object is to provide such a process which will not require the prior preparation of a separate self-sustaining resin sheet for lamination to the substrate.

A further object is to provide such a process which can be carried out reliably, and with minimum labor, in inexpensive and readily available equipment.

A still further, more specific object is to provide a method for applying a hard, anti-staining surface coating of vinyl chloride resin on the surface of vinyl chloride resin flooring products.

*Synopsis of the Invention*

The above and other objects are secured, in accordance with this invention in a process in which a latex of a thermoplastic resin, for example a vinyl chloride resin, is sprayed upon a suitable carrier surface which is hot enough (say 220–320° F.) to flash off the water and leave the resin coated as a loosely adherent powder coating upon the surface. The carrier surface and adherent powder is then pressed against the substrate, which latter is preferably preheated to a temperature sufficient to fuse the resin, additional heat being applied if necessary. The powdery resin on the metal surface becomes compacted and fused to form a homogeneous coating which transfers off from the carrier surface to the substrate, forming a smooth, hard, continuous top layer thereon.

The invention will be described in connection with the attached drawings, wherein:

FIG. 1 is a flow sheet showing one method of carrying out the process of this invention, FIG. 2 is a schematic view of an apparatus for the continuous carrying out of the process of the invention, and FIG. 3 is a schematic view of an apparatus for simultaneously applying a hard surface coating according to the invention, together with an immediately subjacent plasticized resin layer.

*The Thermoplastic Resin Latices*

These are well-known compositions comprising colloidal dispersions, in water, of particles of thermoplastic resins on the order of .05 to 5 microns, and preferably .1 to 1 micron in diameter. They are usually produced by agitating a suitable monomer in an aqueous medium containing a water-soluble peroxidic catalyst and a micelle-forming surface-active agent. Polymerization takes place, and there results a dispersion of particles of the polymerized monomer in the aqueous medium. Monomers which can be polymerized in this way to form latices of thermoplastic resins suitable for use in this invention include for instance vinyl chloride, methyl methacrylate, methyl alpha-chloroacrylate, styrene, alpha-methyl styrene, vinylidene chloride, the various chlorostyrenes and the like. Vinyl chloride resin latices are particularly useful, since these resins have desirable properties and are cheap and readily available as latices. In such vinyl chloride latices, in place of the unmixed vinyl chloride monomer, there may of course be employed mixtures thereof with up to 20%, based on the weight of the mixture, other ethylenically unsaturated compounds copolymerizable therewith such as vinyl esters on the order of vinyl fluoride, vinyl acetate, vinyl stearate and the like; alpha-unsaturated ketones and ethers such as vinyl ethyl ketone, methyl isopropyl ketone, methyl isopropenyl ketone, methyl vinyl ether, isopropynl vinyl ether, and the like; esters and nitriles of alpha-unsaturated carboxylic acids such as methyl methacrylate, ethyl acrylate, acrylonitrile, dibutyl maleate and the like; vinylidene compounds such as vinylidene chloride, vinylidene fluoride, vinylidene fluorochloride and the like; mono-unsaturated olefins such as ethylene, propylene, isobutylene and the like; and conjugated di-ethylenically unsaturated compounds such as butadiene, isoprene, chloroprene, 2,3-dimethyl-1,3-butadiene, piperlylene and the like. For a fairly complete list of materials known to copolymerize with vinyl chloride, reference may be had to Krczil, "Kurzes Handbuch der Polymerisationstechnik-II Mehrstoff Polymerisation," Edwards Brothers Inc., 1945, pp. 735–737, the items under "Vinylchlorid". Instead of the individual unsaturated comonomers of the types above indicated, mixtures of such comonomers may enter into the copolymers, it being understood that the total quantity thereof shall be small enough (i.e., not over 20%, based on the weight of copolymer) that the essential quality of the polyvinyl chloride chain is unaltered.

The Substrate

The base upon which the thermoplastic resin top coatings are deposited according to the invention may be of any structural material which it may be desired to provide with this type of finish, providing, of course that the material is itself capable of withstanding the heat required to effect fusion and consolidation of the resin top coat. Thus, the base may comprise pulp-board, felt, cork, fiber, cardboard, paper and the like. Particularly suitable bases are those which are based on vinyl chloride resins, such as vinyl flooring composition sheet, vinyl floor tile, vinyl resin impregnated pulp-board, plasticized vinyl calendered sheeting, unplasticized vinyl calendered sheeting, vinyl coated fabrics, vinyl bonded cork, leather and wood compositions, vinyl coated and/or saturated papers and felts and the like.

With respect to the conditions of operation, the spraying of the latex upon the carrier surface from which the coating is to be transferred to the substrate should be carried out so as to deposit the amount of resin suited to the purpose at hand, say about 0.0005 to about 0.1 pound of resin (dry basis) per square foot of the carrier surface. The temperature of the carrier surface should be high enough, say 200° F. or higher, so as to rapidly evaporate the water from the latex. The temperature should not be so high as to cause spattering of the latex coat as it is sprayed; preferably, there should only be a light sintering, so as to form a chalky but continuous and lightly-adhering coating of resin on the carrier surface. For this reason the temperature should be below 400° F. and preferably below 380° F. Sufficient time should elapse between the deposition of the film and the juxtaposition thereof to the surface to which it is finally applied, that any water therein is completely evaporated before the film is contacted with the substrate. The surface of the substrate itself should be heated to a temperature, say 290° F. to 330° F., and preferably about 300° F., such as to cause complete fusion of the resin coating, and insure its transfer to the substrate. The carrier surface may be formed of metal, such as steel, stainless steel, or Monel metal, or of other materials such an enamelled steel, Teflon, or the like.

The coatings applied in accordance with this invention are hard, firmly adherent and impervious, and reproduce faithfully the surface from which they were taken. Thus, when the carrier surface is highly polished, the coating will have a smooth, glossy finish. If the carrier surface is frosted, textured, or embossed, the final coating will faithfully reproduce these surfaces also. They have particularly excellent anti-staining properties when applied on top of vinyl flooring sheeting and tiles. As noted above, the conventional method of preparing a hard, unplasticized self-supporting vinyl sheet, and thereafter laminating the sheet on top of the flooring product, entails a considerable hot-working of the resin, which weakens its resistance to plasticizer migration and consequent staining. The coatings of the present invention have been subjected only to minimal mechanical distortion, and this is reflected in a much superior resistance to staining.

Referring now to the drawings in detail, and first to FIG. 1, there is illustrated a process in which a polished stainless steel sheet 10 is preheated in an oven 12 at a temperature above the boiling point of water. The sheet 10 is removed from the oven and, while still hot, sprayed with an air-gun 13 at a station 14 with a latex of a thermoplastic resin, conveniently a polyvinyl chloride resin, the heat of the sheet 12 causing the water to flash off, leaving a chalky, loosely adherent coating 16 of resin on the surface of the sheet 10. The spraying is regulated so as to deposit the required amount of resin suited to the purpose at hand on the sheet 10. The stainless sheet 10 is then laid up with a sheet of pulp-board 18 which had previously been impregnated with a thermoplastic resin latex and dried. In the lay-up, the side of the sheet 10 coated with the latex is next to the pulp-board 18. The assembly is then pressed in a flat-platen heated press 20. The platens of the press are then cooled, the assembly removed, and the sheet 10 separated from the assembly, the vinyl chloride resin 16 formerly adhering to the sheet 10 having coalesced into a hard, smooth, homogeneous, transparent coating 26 which separates cleanly from the sheet 10 and remained firmly adhered to the board 10. The final product 22 consisted of the pulp-board base 24 (derived from the pulp-board 12) which base 24 was substantially compacted by the heat and pressure of the press 20, which also caused the resin particles therein to fuse, flow and bind the fibers of the pulp-board together; and a hard, smooth surface coating 26 of resin adhered to the base 24.

In one specific illustrative case of the carrying out of the process above described, the thermoplastic resin latex employed was a dispersion of polyvinyl chloride containing 50% resin, 50% water; the sheet 10 was preheated to 220° F. in the oven 12; the amount of resin deposited on the sheet 10 was 0.005 lb. per sq. ft.; the pulp-board contained 25% of polyvinyl chloride; and the pressing in the press 20 was carried out with a platen temperature of 300° F., and a pressure of 1000 p.s.i. for 3 minutes.

Referring now to FIG. 2, there is shown an apparatus for the continuous carrying out of the process of this invention for applying a scuff- and stain-resistant top coating to a vinyl flooring material. There is shown a reel 30 of a previously-prepared sheet of plasticized vinyl chloride resin composition flooring material 34, from which the flooring material is fed out under a bank of infra-red lamps 36 which heat the top surface of the flooring material 34 substantially above the softening point of the vinyl chloride resin therein, say to about 310° F. The sheet 34 next goes to the coating apparatus which comprises a pair of rolls 38 and 40, revolving as indicated by the arrows 47, through the nip 43 of which the sheet 34 passes. The upper roll 38 is maintained at a temperature (say 320° F.) above the boiling point of water, and a latex of a polyvinyl chloride resin is sprayed onto the upper roll 38 by means of a bank of pneumatic spray guns 42, the water in the latex being instantly flashed off by the heat of the roll 38, leaving the polyvinyl chloride resin deposited thereon as a loosely-adherent chalky coating 44. The coating is carried around by the revolution of the rolls, and is forced against the upper surface of the sheet 36 by the pressure in the nip 43. The pressure in the nip and temperature of the sheet are such as to cause the resin of the coating 44 to fuse and coalesce to a smooth, lustrous, hard, transparent coating 45 upon the top surface of the sheet 36. The sheet 36 then passes through a cooling tunnel 46 and is then rolled up at 48 for storage and shipment. When the sheeting 36 was installed as a floor covering, it exhibited a very high degree of resistance to scuffing and wear, and was free from staining difficulties.

Referring now to FIG. 3, there is shown a modification of the apparatus of FIG. 2, in which a relatively soft, plasticizer layer of vinyl resin is laid down upon the flooring sheet, and a relatively hard, unplasticized top coating is laid down on a top coating above the plasticized layer. In the drawing there is shown, as before, a reel 50 from which a vinyl chloride resin flooring composition sheet 52 is reeled out under a bank of infra-red lamps 53 which raise the surface temperature of the sheet to about 300° F. before it passes into the nip of a pair of rolls 54, 56 which revolve in the directions of the arrows 58. The roll 54 is maintained at about 330° F., and a bank of pneumatic spray guns 55 direct a spray of vinyl chloride resin latex upon the roll. The heat of the roll causes the water in the latex to flash off, leaving a loosely adhering, chalky coating 60 of resin latex thereon. The motion of the roll 54 carries this coating around to a second bank of pneumatic spray guns 57, which deposit a coating 62 of a vinyl chloride resin plastisol on top of the coating 60. Both coatings 60 and 62 are carried around by the rotation of the roll 54, and pressed against the sheeting 52 in the nip between the rolls 54 and 56. The heat from the sheeting 52 completes the fluxing of the plastisol layer 62 and fuses the layer 62, so that they transfer and become adhered to the sheeting 52 to form a composite adhered structure comprising the base sheeting 52, an intermediate plasticized vinyl resin layer 64 derived from the former plastisol layer 62, and a smooth, lustrous, hard surface coating of vinyl chloride resin derived from the fusion and consolidation of the vinyl chloride resin coating 60. The product is cooled in a chamber 64 and wound up for storage and transportation at 66.

From the foregoing general discussion and detailed description, it will be seen that this invention provides a novel and effective method for the application of hard, unplasticized thermoplastic resin coatings to a wide variety of substrates. The process may be carried out by the use of inexpensive equipment and with a minimum of skilled attendance. The coatings applied in accordance with this invention are hard, smooth, firmly adherent and impervious. They have particularly excellent anti-staining properties when applied to vinyl flooring sheeting and tiles.

What is claimed is:

1. Process of applying a coating of an unplasticized vinyl chloride resin to a substrate sheet which comprises preheating the to-be-coated surface of the substrate sheet to the softening point of the resin, passing the sheet through the nip of a pair of rotating rolls, spraying a latex of the said unplasticized vinyl chloride resin upon the surface of the roll contacting the to-be-coated side of the sheet, which roll is heated to a temperature sufficient to evaporate the water from the impinging spray of latex so as to leave the said resin as a lightly sintered, chalky, continuous, lightly adherent, uncompacted coating upon the roll, the revolving motion of said roll carrying the coating into the nip of that roll with the other roll, and the heat and pressure in said nip causing the said resin adhering to the roll to be fused and consolidated into a continuous layer and to become transferred and adhered to the substrate sheet as a continuous coating thereon.

2. Process of applying an unplasticized vinyl chloride resin coating to a substrate, which comprises spraying a latex of an unplasticized vinyl chloride resin upon a heated carrier surface, whereby the water in the impinging spray is evaporated, leaving a lightly sintered, chalky, continuous, lightly adherent, uncompacted coating of said vinyl chloride resin upon said surface, and thereafter juxtaposing said surface and said substrate under heat and pressure to consolidate and fuse said coating of vinyl chloride resin to a continuous layer and to transfer and adhere the same to said substrate as a continuous coating thereon.

3. Process for applying an unplasticized polyvinyl chloride coating to a substrate sheet which comprises spraying an unplasticized polyvinyl chloride latex upon a heated carrier sheet, whereby the water in the latex spray is evaporated, leaving a lightly sintered, chalky, continuous, lightly adherent, uncompacted coating of unplasticized polyvinyl chloride upon the surface of the carrier sheet, assembling the substrate sheet and the carrier sheet with the coating toward the substrate and in contact with the surface thereof which is to be coated, and subjecting the assembly to heat and pressure whereby to consolidate and fuse said uncompacted coating to form a continuous layer and to transfer and adhere the same to said substrate as a continuous coating thereon.

4. Process for applying an unplasticized polyvinyl chloride coating to a fibrous cellulosic sheet which comprises spraying an unplasticized polyvinyl chloride latex upon a heated carrier sheet, whereby the water in the latex spray is evaporated, leaving a lightly sintered, chalky, continuous, lightly adherent, uncompacted coating of unplasticized polyvinyl chloride upon the surface of the carrier sheet, assembling the fibrous cellulosic sheet and the carrier sheet with the uncompacted coating toward the fibrous cellulosic sheet and in contact with the surface thereof which is to be coated, and subjecting the assembly to heat and pressure whereby to consolidate and fuse said coating to form a continuous layer and to transfer and adhere the same to said fibrous cellulosic sheet as a continuous coating thereon.

5. Process of applying a coating of unplasticized polyvinyl chloride to a vinyl chloride composition sheet which comprises preheating the to-be-coated surface of the vinyl chloride composition sheet to the softening point of the polyvinyl chloride, passing the sheet through the nip of a pair of rotating rolls, spraying an unplasticized polyvinyl chloride latex upon the surface of the roll contacting the to-be-coated side of the sheet, which roll is heated to a temperature sufficient to evaporate the water from the impinging spray of latex so as to leave the unplasticized polyvinyl chloride as a lightly sintered, chalky, continuous, lightly adherent, uncompacted coating upon the roll, the revolving motion of said roll carrying the coating into the nip of that roll with the other roll, the heat and pressure in said nip causing the unplasticized polyvinyl chloride adhering to the one roll to be fused and consolidated into a continuous layer and to become transferred and adhered to the vinyl chloride composition sheet as a continuous coating thereon.

6. Process of applying a coating of unplasticized polyvinyl chloride to a vinyl chloride composition sheet which comprises preheating the to-be-coated surface of the substrate sheet to the softening point of the unplasticized polyvinyl chloride, passing the sheet through the nip of a pair of rotating rolls, spraying an unplasticized polyvinyl chloride latex upon the surface of the roll contacting the to-be-coated side of the sheet, which roll is heated to a temperature sufficient to evaporate the water from the impinging spray of latex so as to leave the unplasticized polyvinyl chloride as a lightly sintered, chalky, continuout, lightly adherent, uncompacted coating upon the roll, spraying a layer of an unconverted plastisol composition on top of said uncompacted coating at a point sufficiently far along in the revolution of the roll that the water has been eliminated from the latex-applied coating, the revolving motion of the said roll carrying both superposed coatings into the nip of that roll with the other roll, the heat and pressure in said nip causing the latex-applied coating to be fused and consolidated into a continuous hard layer of unplasticized polyvinyl chloride, and also causing the plastisol composition to flux to form a relatively soft layer, both layers being transferred to the substrate, the plastisol-derived layer being adhered directly to the substrate and serving as a relatively soft bridging layer between the substrate and a hard continuous coating derived by fusion and consolidation of the latex-deposited layer.

References Cited in the file of this patent

UNITED STATES PATENTS

| | | |
|---|---|---|
| 1,999,509 | Merritt | Apr. 30, 1935 |
| 2,320,513 | Drummond | June 1, 1943 |
| 2,513,434 | Tinsley | July 4, 1950 |
| 2,618,580 | Lancaster | Nov. 18, 1952 |
| 2,633,434 | Tanner | Mar. 31, 1954 |
| 2,742,377 | Bezman | Apr. 17, 1956 |
| 2,769,726 | Wetterau et al. | Nov. 6, 1956 |
| 2,799,609 | Dalton | July 16, 1957 |

FOREIGN PATENTS

| | | |
|---|---|---|
| 675,663 | Great Britain | July 16, 1952 |